United States Patent [19]
Kleinhans et al.

[11] 3,858,987
[45] Jan. 7, 1975

[54] DRIVE SHAFT FLANGE COUPLING STRUCTURE HAVING A FIXED SHEAR SPEED

[75] Inventors: Siegfried Kleinhans; Hans Kümmlee, both of Berlin, Germany

[73] Assignee: Siemens Aktiengesellschaft, Munchen, Germany

[22] Filed: May 21, 1974

[21] Appl. No.: 471,912

[52] U.S. Cl..................... 403/2, 403/337, 403/336
[51] Int. Cl.............................................. F16b 7/00
[58] Field of Search .......... 403/337, 338, 336, 335, 403/2; 64/28 R

[56] References Cited
UNITED STATES PATENTS

| | | | |
|---|---|---|---|
| 292,095 | 1/1884 | Carlson | 403/336 |
| 1,637,944 | 8/1927 | Keller | 403/2 X |

Primary Examiner—Andrew V. Kundrat
Attorney, Agent, or Firm—Kenyon & Kenyon Reilly Carr & Chapin

[57] ABSTRACT

A flange coupling structure for connecting the adjacent ends of a plurality of separate shafts each of which includes an annular flange coupled to the end thereof. A plurality of arcuate-shaped segments are disposed about each of the shaft flanges and form a ring thereabout. A breakable annular ring member is disposed about each ring of the segments, and a plurality of fastening means, such as bolts, coupled to the segments and flanges interconnect the shaft ends. The ring member of the structure breaks at a predetermined shaft speed under stress of the centrifugal force generated and permits the coupling structure to separate, thereby interrupting transmission of torque from one shaft to the other.

4 Claims, 5 Drawing Figures

PATENTED JAN 7 1975　　3,858,987

DRIVE SHAFT FLANGE COUPLING STRUCTURE HAVING A FIXED SHEAR SPEED

BACKGROUND OF THE INVENTION

1. Field of the Invention

This invention relates generally to a drive shaft coupling apparatus, and in particular to an improved flange coupling structure for such shafts which is constructed so as to have a fixed shear speed.

2. Description of the Prior Art

Flange coupling structures for interconnecting drive shafts and the like are known in the art. Generally speaking, such couplings generally comprise flanges disposed at each shaft end, such flanges being either separately connected to or integrally formed with the shaft, coupled together by a plurality of fastening bolts. The flanges of such a coupling structure may also be surrounded by a ring member, as described in French Pat. No. 837,304. Such a ring member is disposed over both flanges and is fastened thereto by means of a plurality of keys. In such an arrangement, the fastening bolts secure the flanges together and restrain only the axially directed forces developed between the shafts. The ring member disposed about the flanges, in contrast, transmits the torque developed by the shafts.

In certain industrial applications, there exists the danger of secondary damage where upon the occurrence of certain accidents a drastic increase in the speed of shaft rotation is produced which may cause, for example, the damage of a flywheel. It is thus desirable that flange coupling structures used in such applications be constructed so as to have a fixed shear speed at which the coupling structure breaks apart and disconnects the coupled shafts.

SUMMARY OF THE INVENTION

It is therefore an object of this invention to provide an improved drive shaft coupling structure which breaks apart at a fixed speed of shaft rotation and thereby interrupts the transmission of power by the coupled shafts.

This and other objects are achieved by the invention in a flange coupling structure for connecting the adjacent ends of a plurality of separate shafts each of which includes an annular flange coupled to the end thereof. A plurality of arcuate-shaped segments are disposed about each of the shaft flanges and form a ring thereabout. A breakable annular ring member is disposed about each ring of segments, and a plurality of fastening means are coupled to the ring members and the ring segments for interconnecting the shaft ends. The ring segments include a plurality of apertures for receiving the fastening means which have at least one half of the circumference thereof disposed in the plurality of ring segments. The radial height of each of the ring segments and of each ring member is preferably the same as the axial width of each shaft flange, and the ring segment apertures are perferably disposed at the boundary surfaces thereof between adjacent segments. The apertures may also be disposed in the ring segments so as to have the entire circumference thereof disposed therein.

The flange coupling structure described above thus has a speed-dependent, fixed shear speed which is determined by the strength of the ring member surrounding the ring segments and at which the coupling structure breaks apart and the connection between the drive shafts is interrupted. This breaking action is independent of the direction of shaft rotation and the magnitude of the torque transmitted thereby. The inventive flange coupling structure also has the advantage that the flanges are not damaged by the breaking apart of the coupling structure and can therefore be utilized again. Moreover, the coupling structure can be fitted to existing installations, and installation requires little expense in providing protection against the flying parts. Location of the apertures which receive the fastening means, which may be bolts, at the boundary surfaces of adjacent ring segments, facilitates separation of the bolts from the coupling structure. Also, by assuring that the apertures have their entire circumference within the ring segments, the frictional contact between the bolts and the coupling structure is prevented from impeding the separation of the bolts. These and other features of the inventive flange coupling structure will be described in further detail in the following detailed description.

DETAILED DESCRIPTION

Figure 1:
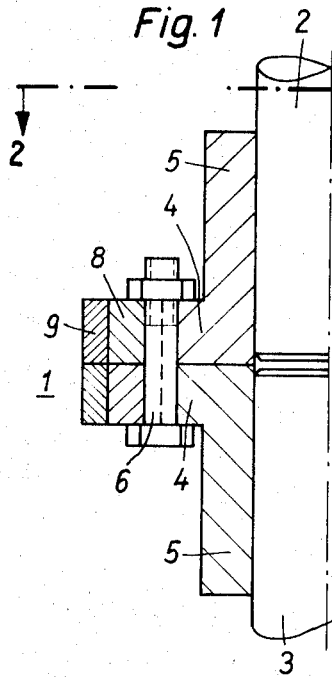
FIG. 1 is an axial cross-sectional view of an improved flange coupling structure constructed according to the invention.
Figure 2:
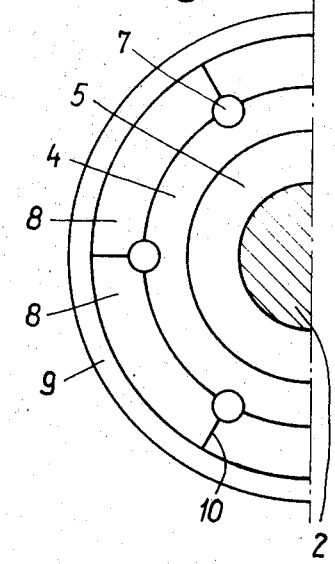
FIG. 2 is a radial cross-sectional view of the coupling structure taken along section 2—2 of FIG. 1.

Referring now to the drawings, and in particular to FIGS. 1 and 2, there is shown a pair of drive shafts 2 and 3 coupled by a flange coupling structure generally designated 1. Shaft 2 is the driving shaft and is connected to a motor (not shown) which is equipped with a flywheel. Shaft 3 is connected to, for example, a coolant pump (not shown) of a nuclear power plant. A hub member 5 is disposed on each of the shafts and includes a flange 4, with the flanges of both shafts being secured together by bolts 6 disposed in apertures 7. Each of the flanges is surrounded about its outer periphery by a plurality of arcuate-shaped segments 8 which, when joined together end-to-end form a ring. This ring of segments is surrounded by a continuous ring member 9, which may, for example, comprise a wrapping. The radial height of the ring segments and ring member 9 in combination is approximately the same as the axial length of each flange 4.

Apertures 7 are circular in shape and have the centers thereof disposed directly on the outer peripheral edge of flanges 4, and have one half of their circumference disposed therein. The other half of the circumference of apertures 7 is disposed in ring segments 8, with the apertures also being disposed directly at the boundary surfaces 10 of adjacent ring segments 8. In manufacturing the flange coupling structure described, ring member 9 is first disposed about segments 8 and then apertures 7 are drilled. Ring member 9 is preferably pretensioned when placed on segments 8 to prevent displacement of the ring segment parts and the fastening bolts during operation at normal speeds.

In operation, the dimensions of and the material making up ring member 9 fix a certain shaft speed at which ring member 9 can no longer withstand its own centrifugal stress and the centrifugal force produced by ring segments 8 and bolts 6, and thus breaks apart. Bolts 6 and ring segments 8 are then released and the torque transmission from shaft 2 to shaft 3 is interrupted. The shear speed of the coupling structure should, of course, be chosen so that the normal shaft operating speeds are well below it, but not too far below it to prevent secondary damage due to excessive shaft speed. The breaking action of the flange coupling structure is independent of the direction of rotation of shafts 2 and 3, and also the magnitude of the transmitted torque, since the latter is transmitted by the bolts 6.

The described flange coupling structure 1 may be used between the drive motor and the coolant pump of a nuclear power plant. Where, for example, a pipe break in the coolant loop occurs, the coolant pump acts as a turbine, and shaft 3 becomes a drive shaft. This accelerating turbine action could cause the shaft speed to rise substantially above the operating speed of the pump. Such an event would cause the flange coupling structure to break and interrupt torque transmission between the motor and pump.

Figure 3:
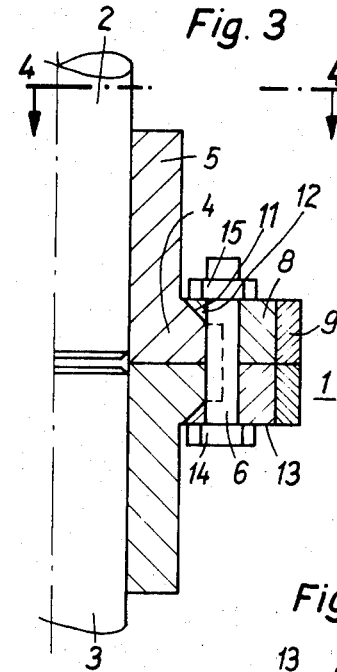
FIG. 3 is an axial cross-sectional view of another embodiment of a flange coupling structure constructed according to the invention.
Figure 4:
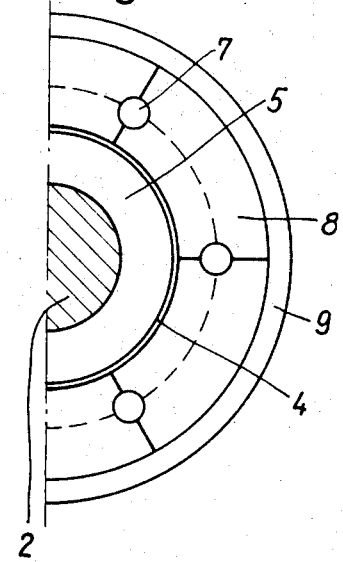
FIG. 4 is a radial cross-sectional view of the coupling structure taken along section 4—4 of FIG. 3.

FIGS. 3 and 4 illustrate another embodiment of the described flange coupling structure of the invention in which the axially outer endfaces 11 of flanges 4 are not at disposed right angles to hub members 5 but rather are inclined with respect thereto up to the edges of apertures 7. Ring segments 8 are provided with an extension 12 which terminates at a correspondingly inclined surface. Thus, the ring segments at their other outer axial endfaces 13, encompass the entire circumference of apertures 7, and when ring member 9 breaks, the separating ring segments also pull bolts 6 away from the flanges. With such an arrangement, the frictional force under the bolt head 14 and/or nut 15 of the tightened bolts cannot affect the separation of the bolts.

Figure 5:
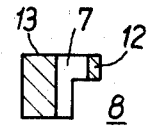
FIG. 5 is a cross-sectional view of one embodiment of a ring segment for the coupling flange structure of the invention.

In FIG. 5 there is shown another embodiment of a ring segment 8 which includes an extension 12 and which completely encompasses the circumference of apertures 7 at the axially outer endface 13 thereof. This type of ring segment is useful for use in conjunction with the flange coupling structure shown in FIGS. 1 and 2.

In the foregoing specification, the invention has been described with reference to specific exemplary embodiments thereof. It will, however, be evident, that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. A flange coupling structure for connecting the adjacent ends of a plurality of separate shafts each of which includes an annular flange coupled to the end thereof, comprising:
    a plurality of arcuate-shaped segments, disposed about each of said shaft flanges and forming a ring thereabout;
    a breakable annular ring member disposed about each ring of said segments; and
    a plurality of fastening means, coupled to said ring segments and said flanges, for coupling the ends of the shafts, said ring segments including a plurality of spaced-apart apertures for receiving said fastening means, at least one half of the circumference of said apertures being disposed in said plurality of ring segments.

2. The coupling structure recited in claim 1, wherein the radial height of each segment ring and ring member in combination is approximately the same as the axial width of each of said shaft flanges.

3. The coupling structure recited in claim 1, wherein said apertures are disposed in said ring segments at the boundary surfaces thereof between adjacent segments.

4. The coupling structure recited in claim 1, wherein said apertures have the entire circumference thereof disposed in said ring segments.

* * * * *